(12) United States Patent
Yeh et al.

(10) Patent No.: US 12,595,960 B2
(45) Date of Patent: Apr. 7, 2026

(54) ADSORBER, PURIFICATION SYSTEM, AND PURIFICATION METHOD

(71) Applicant: Air Products and Chemicals, Inc., Allentown, PA (US)

(72) Inventors: Thomas M. Yeh, Lansdale, PA (US); Ana G. Arevalo-Hidalgo, Allentown, PA (US); Dingjun Wu, Macungie, PA (US); Edward Landis Weist, Jr., Macungie, PA (US); William T. Kleinberg, Emmaus, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 336 days.

(21) Appl. No.: 18/214,027

(22) Filed: Jun. 26, 2023

(65) Prior Publication Data

US 2024/0426547 A1 Dec. 26, 2024

(51) Int. Cl.
| | |
|---|---|
| B01D 53/04 | (2006.01) |
| B01D 53/26 | (2006.01) |
| F25J 3/04 | (2006.01) |

(52) U.S. Cl.
CPC ...... F25J 3/04169 (2013.01); B01D 53/0423 (2013.01); B01D 2253/104 (2013.01);
(Continued)

(58) Field of Classification Search
CPC .. F25J 3/04169; B01D 53/0423; B01D 53/04; B01D 2253/104; B01D 2253/108; B01D 2253/302; B01D 2256/10; B01D 2256/12; B01D 2257/402; B01D 2257/504; B01D 2257/80; B01D 2259/4146; B01D 2259/416; B01D 53/261; B01D 53/0462;
(Continued)

(56) References Cited

U.S. PATENT DOCUMENTS

| | | |
|---|---|---|
| 4,472,178 A | 9/1984 | Kumar et al. |
| 4,541,851 A | 9/1985 | Bosquain et al. |

(Continued)

FOREIGN PATENT DOCUMENTS

| | | |
|---|---|---|
| CA | 2357276 A1 | 3/2002 |
| EP | 0449576 A1 | 10/1991 |

(Continued)

*Primary Examiner* — Frank M Lawrence, Jr.
(74) *Attorney, Agent, or Firm* — Matthew R. Weaver

(57) ABSTRACT

An adsorber for utilization in purification systems for cryogenic fluid processing can include a first layer of adsorbent material and a second layer of adsorbent material within a bed of adsorbent material within the adsorber. The first layer can include alumina or other water removal adsorbent material while the second layer can include NaMSX or other suitable molecular sieve adsorbent material. The first layer can be sized to be substantially smaller than the second layer to facilitate a pre-selected ratio of water adsorption to molecular sieve adsorption so that water can break through the first layer to the second layer during purification operations while the volume of the adsorber can be provided in a much smaller size with much less adsorbent material utilized in the bed as compared to conventional designs. Embodiments can provide an increased purification operational capacity with reduced need for adsorbent material.

11 Claims, 9 Drawing Sheets

(52) U.S. Cl.
CPC .. *B01D 2253/108* (2013.01); *B01D 2253/302* (2013.01); *B01D 2256/10* (2013.01); *B01D 2256/12* (2013.01); *B01D 2257/402* (2013.01); *B01D 2257/504* (2013.01); *B01D 2257/80* (2013.01); *B01D 2259/4146* (2013.01); *B01D 2259/416* (2013.01)

(58) Field of Classification Search
CPC .............. B01D 53/047; B01D 2253/25; B01D 2257/502; B01D 2259/402; B01D 53/0438; B01D 2253/106; Y02C 20/40
USPC ...... 96/121, 132, 134; 95/96, 116, 117, 128, 95/129, 139; 423/230
See application file for complete search history.

(56) References Cited

U.S. PATENT DOCUMENTS

| | | | |
|---|---|---|---|
| 4,784,672 | A | 11/1988 | Sircar |
| 5,137,548 | A | 8/1992 | Grenier et al. |
| 5,232,474 | A | 8/1993 | Jain |
| 5,425,240 | A | 6/1995 | Jain et al. |
| 5,728,198 | A * | 3/1998 | Acharya ............... B01D 53/02 |
| | | | 95/114 |
| 5,759,242 | A | 6/1998 | Smolarek et al. |
| 5,846,295 | A | 12/1998 | Kalbassi et al. |
| 5,855,650 | A | 1/1999 | Kalbassi et al. |
| 5,917,136 | A | 6/1999 | Gaffney et al. |
| 6,086,659 | A | 7/2000 | Tentarelli |
| 6,106,593 | A | 8/2000 | Golden et al. |
| 6,152,991 | A | 11/2000 | Ackley |
| 6,506,236 | B2 | 1/2003 | Golden et al. |
| 6,599,347 | B2 | 7/2003 | Kalbassi et al. |
| 6,866,075 | B2 | 3/2005 | Whitley et al. |
| 7,022,159 | B2 | 4/2006 | Kalbassi et al. |
| 7,285,154 | B2 | 10/2007 | Karwacki, Jr. et al. |
| 7,413,595 | B2 | 8/2008 | Schmidt et al. |
| 8,206,669 | B2 | 6/2012 | Schaffer et al. |
| 8,262,783 | B2 | 9/2012 | Stoner et al. |
| 8,268,044 | B2 | 9/2012 | Wright et al. |
| 8,404,024 | B2 | 3/2013 | Henderson et al. |
| 8,518,356 | B2 | 8/2013 | Schaffer et al. |
| 8,734,571 | B2 | 5/2014 | Golden et al. |
| 8,814,985 | B2 | 8/2014 | Gerds et al. |
| 9,108,145 | B2 | 8/2015 | Kalbassi et al. |
| 9,199,190 | B2 | 12/2015 | Malik et al. |
| 9,631,864 | B2 | 4/2017 | Chen et al. |
| 9,731,241 | B2 | 8/2017 | Kalbassi et al. |
| 2011/0206581 | A1 | 8/2011 | Ackley et al. |
| 2011/0219950 | A1 | 9/2011 | Rodrigues et al. |
| 2012/0011887 | A1 * | 1/2012 | Nakamura ........... F25J 3/04181 |
| | | | 62/640 |
| 2018/0126320 | A1 * | 5/2018 | Grahl .................... B01J 8/0015 |
| 2019/0291078 | A1 | 9/2019 | Weist, Jr. et al. |
| 2022/0016565 | A1 * | 1/2022 | Krishnamurthy .. B01D 53/0431 |
| 2022/0096993 | A1 * | 3/2022 | Malik ................ B01D 53/0438 |
| 2023/0027070 | A1 | 1/2023 | Malik et al. |
| 2023/0087673 | A1 * | 3/2023 | Krishnamurthy .... F25J 3/04163 |
| | | | 95/90 |
| 2024/0139673 | A1 * | 5/2024 | Wright ............... B01D 53/0462 |

FOREIGN PATENT DOCUMENTS

| | | | |
|---|---|---|---|
| EP | 1417995 | A1 | 5/2004 |
| GB | 2603936 | A | 8/2022 |

* cited by examiner

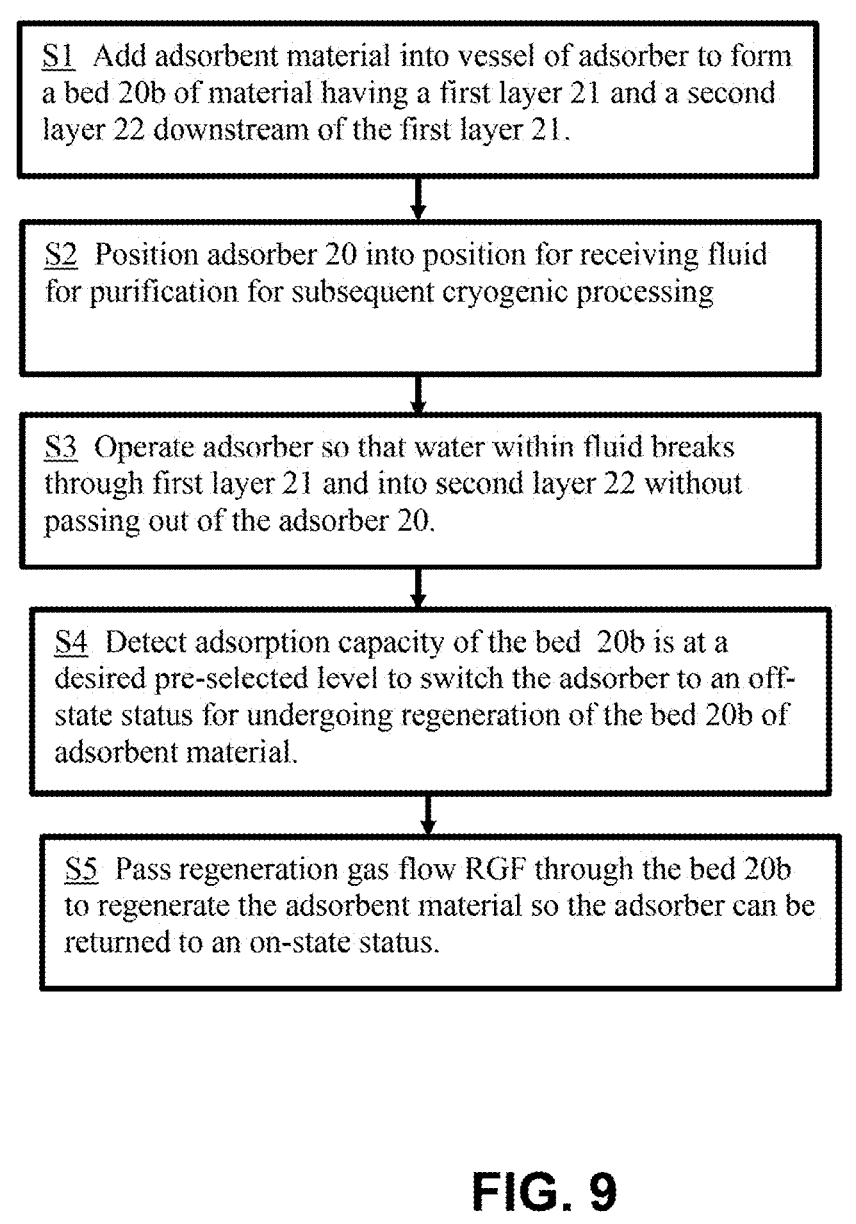

S1  Add adsorbent material into vessel of adsorber to form a bed 20b of material having a first layer 21 and a second layer 22 downstream of the first layer 21.

↓

S2  Position adsorber 20 into position for receiving fluid for purification for subsequent cryogenic processing

↓

S3  Operate adsorber so that water within fluid breaks through first layer 21 and into second layer 22 without passing out of the adsorber 20.

↓

S4  Detect adsorption capacity of the bed  20b is at a desired pre-selected level to switch the adsorber to an off-state status for undergoing regeneration of the bed 20b of adsorbent material.

↓

S5  Pass regeneration gas flow RGF through the bed 20b to regenerate the adsorbent material so the adsorber can be returned to an on-state status.

FIG. 9

ADSORBER, PURIFICATION SYSTEM, AND PURIFICATION METHOD

TECHNICAL FIELD

The present innovation relates to adsorbers, pre-purification unit arrangements utilizable in cryogenic fluid processing systems and/or purification systems, adsorbers for purification of air in air separation systems, air separation systems, and methods of making and using the same.

BACKGROUND

Adsorbers typically come in four different common configurations: vertical, vertical cross flow, horizontal, and radial. Examples of these types of adsorbers can be appreciated from the disclosures of U.S. Pat. Nos. 4,472,178, 4,541,851, 4,784,672, 5,137,548, 5,232,474, 5,425,240, 5,759,242, 5,846,295, 5,855,650, 5,917,136, 6,086,659, 6,106,593, 6,152,991, 6,506,236, 6,599,347, 6,866,075, 7,022,159, 7,285,154, 7,413,595, 8,206,669, 8,262,783, 8,268,044, 8,404,024, 8,518,356, 8,734,571, 8,814,985, 9,108,145, 9,199,190, 9,631,864, and 9,731,241, U.S. Pat. App. Pub. Nos. 2011/0206581, 2011/0219950, 2019/0291078 and 2023/0027070, Canadian Patent Publication No. 2,357,276 A, and European Patent Publication No. EP 1 417 995 A1.

Thermal Swing Adsorption (TSA) is frequently used alongside technology like Pressure Swing Adsorption (PSA) as pre-purification to air cryogenic distillation processes. TSA's function is to remove components with high freezing point such as ambient moisture (e.g., water vapor, $H_2O$) and carbon dioxide ($CO_2$) which would otherwise freeze out in downstream processing, causing operability issue like blockage. Nitrous oxide ($N_2O$), hydrocarbons (e.g., methane, $CH_4$, etc.), and other impurities can also be removed via front-end purification to avoid these impurities from accumulating in downstream processes.

BRIEF SUMMARY OF THE INVENTION

Conventionally, adsorbers are designed and operated for purification of a feed of air or gas to avoid permitting water to break through a moisture removal layer to a downstream layer (if present) of adsorbent material in an adsorber to avoid any water from being output from the adsorber within the purified fluid while also permitting downstream layers of adsorbent material to remove nitrous oxide, carbon dioxide and other impurities for forming the purified fluid to be output from the adsorber. The removal of water in the initial layer of adsorbent material is often considered critical so that water breakthrough can be avoided so that one or more downstream layers of adsorbent material can effectively remove other target impurities. Conventional designs often configure a bed of adsorbent material and set concentration limits for at least one target impurity (e.g. nitrous oxide and/or carbon dioxide concentrations) in the fluid output from a pre-purification unit (PPU) to help ensure water is prevented from breaking through an on-state adsorber and passing into downstream equipment while also preventing other target impurities from exceeding pre-selected threshold values for passing into that downstream equipment.

We have surprisingly found that this type of conventional approach has substantial drawbacks and inefficiencies, which we believe have not been previously recognized or appreciated. Often, a moisture removal layer will be designed to be quite a large portion of a bed of adsorbent material in an adsorber for removal of moisture. Such a layer can be an entirety of the bed of material or make up at least 50% of the adsorbent material of a bed of adsorbent material, for example. We have surprisingly found that such arrangements utilize too much water removal adsorbent material that can result in adsorbers being sized much larger than needed to accommodate their purification objectives as well as incurring significant delay in expense in layering of material to account for a conventional moisture removal design for an adsorber. Such conventional designs have been surprisingly found to have a higher cost of fabrication and operation, generate much more waste for spent material, incur substantially more cost and regeneration delay in terms of regeneration of the adsorbent material, and pose other drawbacks for flexible and efficient operation of a system for purification of a feed of fluid for cryogenic processing or other processing.

In contrast to conventional designs that were surprisingly found to have such shortcomings, embodiments of our adsorber, PPU, apparatus, and methods of making and using the same can provide substantial improvements in operational flexibility and operational efficiency. Embodiments can permit safe and effective use of smaller sized adsorbers requiring use of less material and having lower capital costs, maintenance costs, and operational costs, for example.

Embodiments can also permit regeneration cycles to take less time and/or incur less operating expense due to the smaller sized adsorbers and adsorbent beds that can be utilized. Further, embodiments can be easier to maintain by providing simpler adsorbent material filling and removal via the smaller volume of material, smaller sized adsorbers and other features. The smaller sized adsorbers that can be permitted can provide a smaller vessel height as compared to conventional systems and also provide a reduced pressure drop, which can further enhance their ability to provide improved operational flexibility and improved efficient operation of a larger system incorporating one or more of our adsorbers.

Some embodiments of our adsorber can be provided for use in PPUs, cryogenic fluid processing, and other environments in which a front-end first layer of adsorbent material that includes alumina being between 10% and 40% of the overall mass of adsorbent material within the adsorber and a remaining 90% to 60% of the overall mass of adsorbent bed material includes a molecular sieve layer of material (e.g. NaLSX, NaMSX, 13X, or other suitable molecular sieve adsorbent material). This proportional range (e.g. a range of 1:9 to 1:1.4 parts moisture removal adsorbent material layer to molecular sieve adsorbent material layer, range of 1:9 to 1:4 parts moisture removal adsorbent material layer to molecular sieve adsorbent material layer, etc.) can provide a desired purification capacity even though water is permitted to break through the first layer and into the second layer during on-state purification processing of a fluid while the fluid is at a temperature of between 5° C. and 30° C. Embodiments having this type of proportional range were surprisingly found to be less expensive to fabricate and operate while also having improved operational flexibility and more efficient operation and a suitable and acceptable level of water removal capacity that was equivalent, if not superior, to conventional designs having substantially larger water removal layer proportions (e.g. 50% of the bed being a water removal layer or over 50% of the bed being a water removal layer) that also necessitated substantially larger adsorbent bed volume layers and larger adsorber vessel sizing.

Yet other embodiments can provide this type of improvement for use in PPUs, cryogenic fluid processing, and other environments in which a front-end first layer of adsorbent material that includes alumina being between 10% and 45% of the overall mass of adsorbent material within the adsorber and a remaining 90% to 55% of the overall mass of adsorbent bed material includes a molecular sieve layer of material (e.g. NaLSX, CaX, or other suitable molecular sieve adsorbent material). This proportional range can provide a desired purification capacity even though water is permitted to break through the first layer and into the second layer during on-state purification processing of a fluid while the fluid is at a temperature of between 5° C. and 30° C. Embodiments having this type of proportional range were also surprisingly found to be less expensive to fabricate and operate while also having improved operational flexibility and more efficient operation and a suitable and acceptable level of water removal capacity that was equivalent, if not superior, to conventional designs having substantially larger water removal layer proportions (e.g. 50% of the bed being a water removal layer or over 50% of the bed being a water removal layer) that also necessitated substantially larger adsorbent bed volume layers and larger adsorber vessel sizing.

We believe that embodiments can be provided so that a first layer of adsorbent material can be sized so that water breaks through the first layer into an adjacent downstream second layer of adsorbent material of the bed of adsorbent material within the adsorber to cause the water to be preferentially adsorbed by the upstream portion of the second layer. We believe this can cause other impurities (e.g. $CO_2$ and $N_2O$) that were previously captured by that upstream portion of the material of the second layer to be released and a downstream portion of the second layer can then adsorb the released impurities (e.g. $CO_2$ and $N_2O$) more efficiently because there is a higher concentration of those other impurities in the fluid to be adsorbed in the second layer due to the adsorption of water and release of the other impurities that can occur. We believe that this functioning can permit the entirety of the second layer to be more effectively used for adsorption of non-water impurities, can permit a fuller utilization of the first layer of material for water adsorption, and can also permit a much larger portion of the material within the bed of adsorbent material to be fully utilized for adsorption.

In a first aspect, an adsorber for a pre-purification unit (PPU) of a cryogenic fluid processing system is provided. The adsorber can include a vessel that is connectable between a compressor system and a heat exchanger and a bed of adsorbent material positioned in the vessel. The bed can include a first layer of adsorbent material for removal of water and a second layer of adsorbent material for removal of water as well as other impurities that include carbon dioxide ($CO_2$) and nitrous oxide ($N_2O$). The bed of adsorbent material can be positioned and configured such that the first layer is positioned adjacent the second layer so that water breaks through the first layer to the second layer during purification of a fluid passed through the bed so that the second layer removes water as well as the other impurities from the fluid to output a purified fluid that has no water and the other impurities in the purified fluid are at or below at least one pre-selected threshold.

The fluid can be air or other gas that is passable through the bed of material within the vessel. The bed of material can be within a chamber defined by the vessel. The adsorber can be configured as a radial adsorber, horizontal adsorber, vertical adsorber, or other type of adsorber.

In a second aspect, the fluid can be air or other gas, the first layer can include alumina, activated alumina, or alumina impregnated with a potassium salt and the second layer can include NaMSX, NaLSX, or 13X. Other embodiments may utilize other types of adsorbent material for the first and second layers and can be adapted for a particular type of feed gas (e.g. a particular process gas or feed gas to be provided for processing downstream of the PPU).

In a third aspect, the first layer can be smaller than the second layer. For example, the first layer can be between 5 weight percent (wt %) and 25 wt % of the bed and the second layer can be between 95 wt % and 75 wt % of the bed. Other embodiments can utilize other types of layer sizing. In some embodiments, the bed can also include additional layers of adsorbent material to account for purification processing that is desired to occur via the adsorber as well.

For instance, in some embodiments, a ratio of a mass of adsorbent material of the first layer to a mass of adsorbent material of the second layer within the bed is between 1:9 to 1:5.7. In other embodiments, a ratio of a mass of adsorbent material of the first layer to a mass of adsorbent material of the second layer within the bed is between 1:1.4 to 1:20. yet other embodiments can utilize other types of ratios of a mass of adsorbent material of the first layer to a mass of adsorbent material of the second layer within the bed as discussed herein.

In a fourth aspect, the fluid can be air or an industrial gas flow the bed can be configured for operation at a temperature range of between 5° C. and 30° C. or other suitable temperature range (e.g. between 5° C. and 35° C. or between 5° C. and 25° C., between 0° C. and 35° C., etc.).

In a fifth aspect, the bed of adsorbent material can be configured so that the first layer can include alumina, activated alumina, or alumina impregnated with a potassium salt, and the second layer can include NaMSX, NaLSX, or 13X. Such embodiments may not need or use a third layer or other additional layer. Other embodiments may utilize at least one more additional layer of material.

In a sixth aspect, the adsorber of the first aspect can include one or more features of the above discussed second aspect, third aspect, fourth aspect, and/or fifth aspect. Other features as discussed in the exemplary embodiments shown and described herein may also be included in such embodiments. It should therefore be appreciated that other embodiments can utilize other features or elements.

In a seventh aspect, a pre-purification system is provided. The pre-purification system can include an embodiment of our adsorber. For example, the pre-purification system can include an adsorber having a vessel and a bed of adsorbent material comprising a first layer of adsorbent material for removal of water and a second layer of adsorbent material for removal of water as well as carbon dioxide ($CO_2$) and nitrous oxide ($N_2O$) within the vessel. The bed of adsorbent material can be positioned and configured such that the first layer is positioned adjacent to the second layer and sized such that water breaks through the first layer to the second layer during purification of a fluid passed through the bed so that the second layer removes water as well as $CO_2$ and $N_2O$ from the fluid to output a purified fluid that has no water therein.

In some embodiments, the fluid can be air or an industrial gas flow and the purified fluid can have a content of $CO_2$ that is at or below a pre-selected $CO_2$ content threshold and/or the purified fluid can have a content of $N_2O$ that is at or below a pre-selected $N_2O$ content threshold. The thresholds can be any pre-selected threshold (e.g. less than or equal to 350 ppb or less than or equal to 150 ppb, etc.).

In an eighth aspect, the first layer can include alumina, activated alumina, or alumina impregnated with a potassium salt and the second layer can include NaMSX, NaLSX, or 13X. Other embodiments can utilize other materials for the first and second layers as well.

In a ninth aspect, the pre-purification system can be provided such that the first layer is smaller than the second layer. For example, the first layer can be between 5 weight percent (wt %) and 25 wt % of the bed and the second layer can be between 95 wt % and 75 wt % of the bed.

In some embodiments, a ratio of a mass of adsorbent material of the first layer to a mass of adsorbent material of the second layer within the bed is between 1:1.4 and 1:20. In other embodiments, the ratio of a mass of adsorbent material of the first layer to a mass of adsorbent material of the second layer within the bed is between 1:9 to 1:5.7. Yet other embodiments may utilize a different ratio of a mass of adsorbent material of the first layer to a mass of adsorbent material of the second layer within the bed as discussed herein.

In a tenth aspect, the bed can be configured for operation at a temperature range of between 5° C. and 30° C. In other embodiments, the bed can be configured for operation at a temperature range of between 5° C. and 35° C., 0° C. and 35° C., or 5° C. and 25° C. Yet other embodiments can utilize a bed configured for operation within a different temperature range.

In an eleventh aspect, the pre-purification system of the seventh aspect can include one or more features of the above discussed eighth aspect, ninth aspect, and/or tenth aspect. Other features as discussed in the exemplary embodiments shown and described herein may also be included in such embodiments. It should therefore be appreciated that other embodiments can utilize other features or elements.

In a twelfth aspect, a process for purifying a fluid for cryogenic processing is provided. The process can include operating an adsorber to receive fluid for purification. The adsorber can be an embodiment of an adsorber discussed herein, for example. For instance, the adsorber can include a bed of adsorbent material comprising a first layer and a second layer that is downstream of the first layer. The first layer can include adsorbent material that is different from adsorbent material of the second layer. The process can also include passing the fluid through the bed so that water within the fluid breaks through the first layer to the second layer for adsorption in the second layer to remove water from the fluid via the second layer. The second layer can also remove $CO_2$ and $N_2O$ from the fluid while water is being removed from the fluid via the second layer.

In a thirteenth aspect, the temperature of the fluid can be between 5° C. and 30° C. or other suitable temperature range (e.g. a temperature range of between 5° C. and 35° C., 0° C. and 35° C., or 5° C. and 25° C., etc.).

In a fourteenth aspect, the first layer can include alumina, activated alumina, or alumina impregnated with a potassium salt and the second layer can include NaMSX, NaLSX, or 13X.

In a fifteenth aspect, the second layer can be larger than the first layer. For example, the first layer utilized in the process can be between 5 weight percent (wt %) and 25 wt % of the bed and the second layer utilized in the process can be between 95 wt % and 75 wt % of the bed.

In some embodiments, a ratio of a mass of adsorbent material of the first layer to a mass of adsorbent material of the second layer within the bed is between 1:1.4 and 1:20. In other embodiments, the ratio of a mass of adsorbent material of the first layer to a mass of adsorbent material of the second layer within the bed is between 1:9 to 1:5.7. Yet other embodiments may utilize a different ratio of a mass of adsorbent material of the first layer to a mass of adsorbent material of the second layer within the bed as discussed herein.

In a sixteenth aspect, the process can also include outputting the purified fluid for cryogenic processing such that the purified fluid has no water therein and has a content of $CO_2$ that is at or below a pre-selected $CO_2$ content threshold and/or the purified fluid has a content of $N_2O$ that is at or below a pre-selected $N_2O$ content threshold. The thresholds can be any suitable pre-selected threshold (e.g. less than or equal to 350 ppb or less than or equal to 150 ppb, etc.).

In a seventeenth aspect, the process of the twelfth aspect can include one or more features of the above discussed thirteenth aspect, fourteenth aspect, fifteenth aspect, and/or sixteenth aspect. Other features as discussed in the exemplary embodiments of the process shown and described herein may also be included in such embodiments. It should therefore be appreciated that other embodiments can utilize other features or elements.

Other details, objects, and advantages of our cryogenic fluid processing systems, air separation systems, adsorbers, pre-purification systems utilizing one or more adsorbers and methods of making and using the same will become apparent as the following description of certain exemplary embodiments thereof proceeds.

BRIEF DESCRIPTION OF THE DRAWINGS

Exemplary embodiments of cryogenic fluid processing systems, air separation systems, adsorbers, pre-purification systems utilizing one or more adsorbers, adsorbers, and methods of making and using the same are shown in the drawings included herewith. It should be understood that like reference characters used in the drawings may identify like components.

FIG. 9 is a flow chart illustrating an exemplary embodiment of a process of purification of a fluid flow for cryogenic fluid processing. Embodiments of the PPU 17 and cryogenic fluid processing apparatus can be configured to utilize this exemplary embodiment of the process.

DETAILED DESCRIPTION

Figure 1:
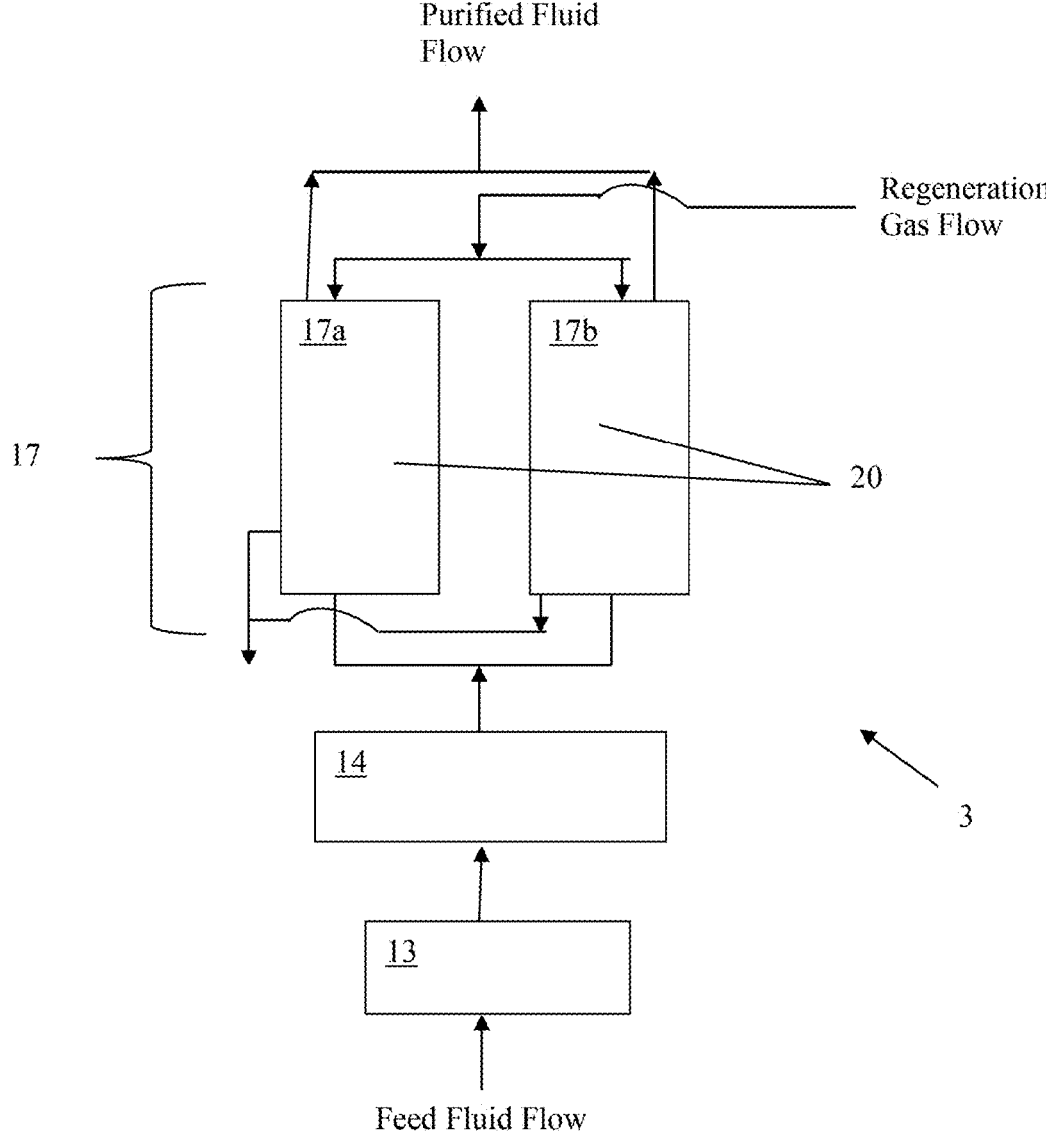
FIG. 1 is a schematic view of a first exemplary embodiment of a pre-purification unit (PPU) of a pre-purification system 3.

FIG. 1 illustrates an exemplary pre-purification system 3 that includes a pre-purification unit (PPU) 17. The PPU 17 of the pre-purification system 3 can include multiple adsorbers 20. Each adsorber 20 of the PPU 17 can include layers of adsorbent material that can remove multiple target elements from the compressed feed that is to be fed to the PPU 17 for purification via adsorption (e.g., exposure to adsorbent material that can include layers of alumina, catalyst material, or other suitable adsorbent material). The adsorbers of the PPU 17 can include a first adsorber 17a and a second adsorber 17b. The first and second adsorbers 17a and 17b can each be configured as a vertical adsorber, a horizontal adsorber or other type of adsorber (e.g., a vertical cross flow adsorber or a radial adsorber, etc.). In some arrangements, the adsorbers can be configured in such that the feed flow comes in from the bottom or the adsorber vessel and the output flow is output out the top or the vessel, or such that the feed flow comes in from the bottom or the vessel and the output flow is passed out of the bottom of the vessel.

Figure 2:
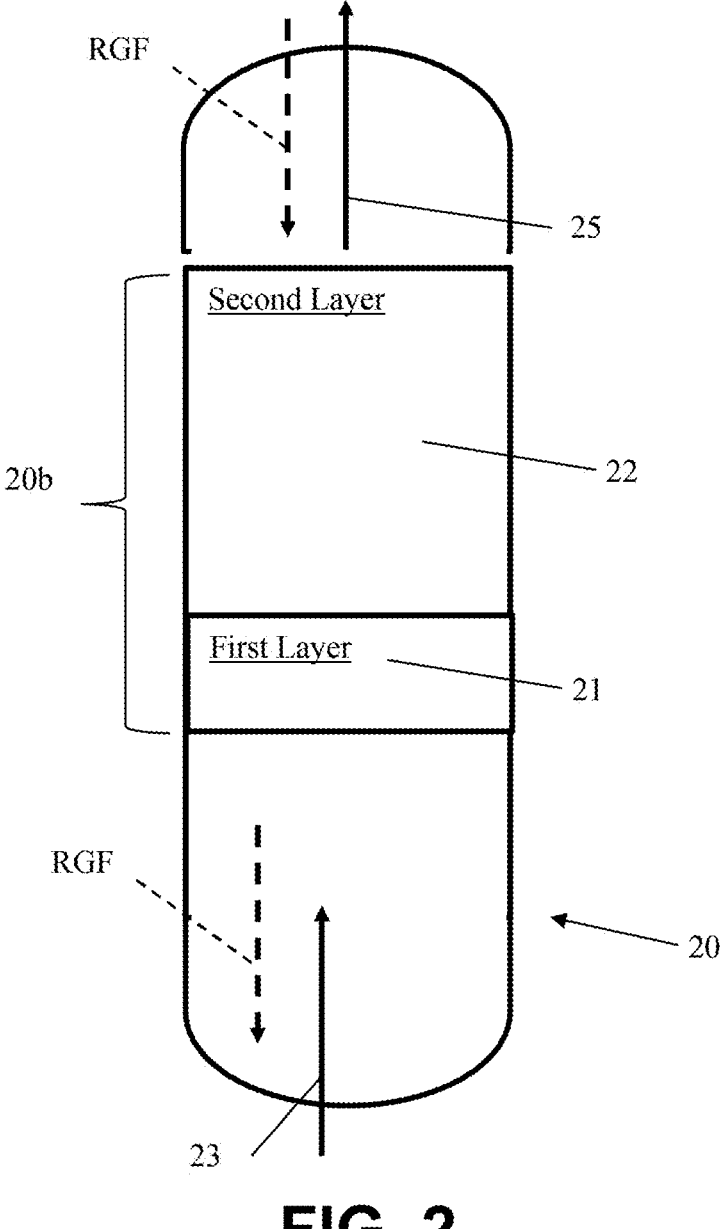
FIG. 2 is a schematic view of a first exemplary embodiment of an adsorber 20 that can be included in the PPU 17 of the pre-purification system 3.
Figure 3:
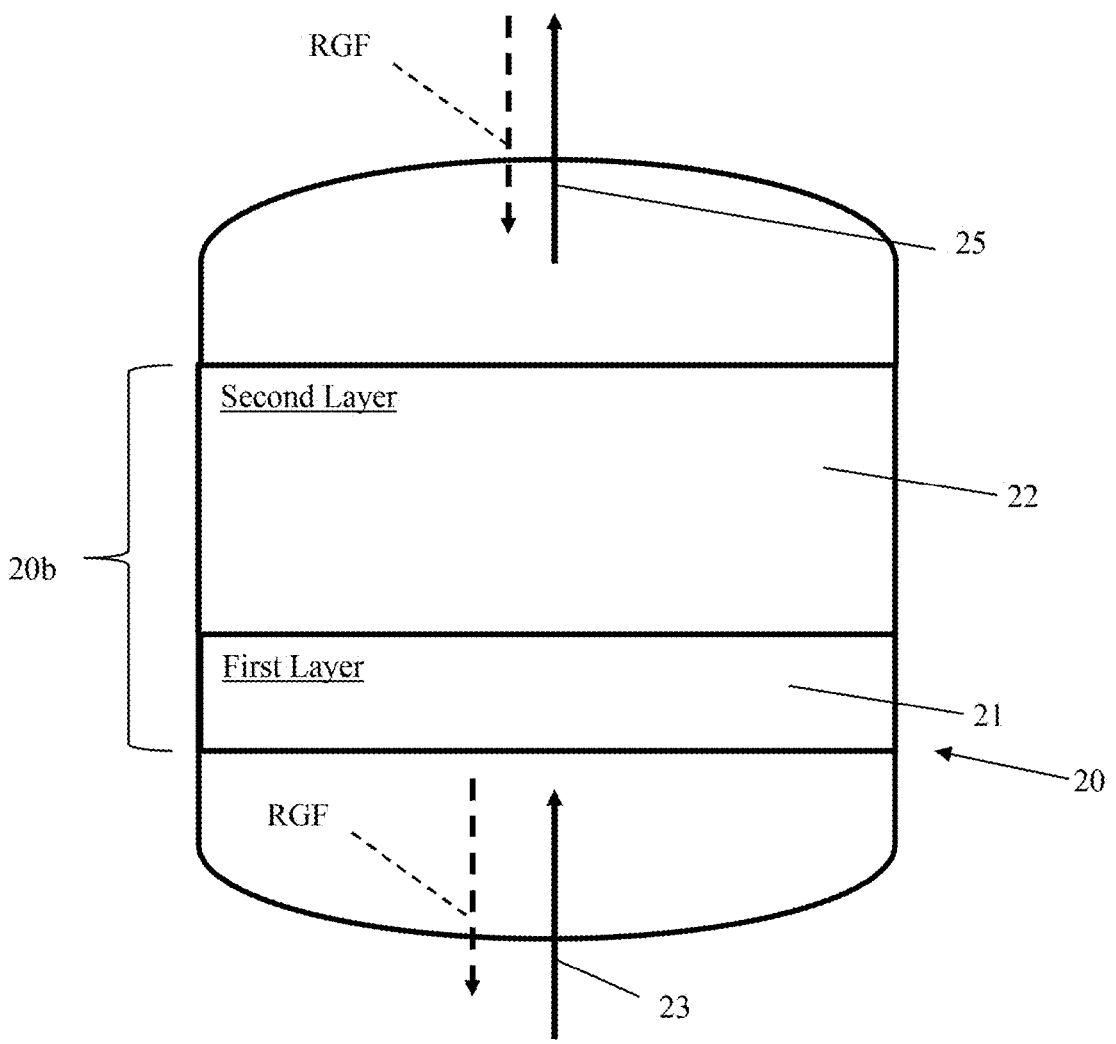
FIG. 3 is a schematic view of a second exemplary embodiment of an adsorber 20 that can be included in the PPU 17 of the pre-purification system 3.

The PPU 17 can utilize an arrangement of adsorbers 20 so they are configured to utilize a thermal swing adsorption process and/or a pressure swing adsorption process. FIGS. 2 and 3 illustrate exemplary embodiments of adsorbers 20 that can be utilized in the PPU 17.

The first and second adsorbers 17a and 17b of the PPU 17 can be arranged within the PPU 17 so that they operate in parallel such that when the first adsorber 17a is on-stream carrying out purification processes by adsorbing target materials from the fluid fed to the PPU 17, the second adsorber 17b can be off-stream so that it can undergo thermal regeneration for regeneration of the bed 20b of the adsorbent material of the adsorber 20. When in an off-stream state, the adsorber may not receive fluid for purification of the fluid.

When the second adsorber 17b is on-stream carrying out purification processes by adsorbing target materials from the air fed to the PPU 17, the first adsorber 17a can be off-stream so it can undergo thermal regeneration for regeneration of the bed 20b of adsorbent material of the adsorber 20.

A regeneration gas flow can be fed to the off-stream state adsorber(s) of the PPU 17 to regenerate the adsorbent material of the adsorber by heating the material so that the impurities adsorbed therein are released and output from the adsorber via the regeneration gas. The output regeneration gas can be emitted to atmosphere or otherwise treated.

It should be appreciated that when an adsorber 20 is in an off-stream state, it can undergo a regeneration process to regenerate the one or more layers of adsorbent material within the adsorber. When returned to the on-stream state, the adsorber can operate with improved efficiency due to the regeneration of the adsorbent material as the regeneration of the material can return that material to a condition that is close to or at its original state for adsorption of target material from a fluid flow.

The PPU 17 can be configured so that the input of fluid into the first adsorber or second adsorber is changed (e.g. via valve position changes, etc.) to switch the parallel adsorbers between their on-stream states and their off-stream states (e.g. when the first adsorber is on-stream, the second adsorber can be off-stream and vice versa). The regeneration gas flow RGF (shown in broken line in FIGS. 2 and 3) that is passed through the adsorber 20 for regeneration of the adsorbent material can be gas obtained via a waste flow output from a low pressure (LP) column (e.g. LP column 11a shown in FIG. 8) or can be gas from another source of a plant or an ASU system.

For at least some embodiments, the regeneration gas flow RGF can pass through the vessel of an absorber 20 along a flow path that is the reverse of the flow path of fluid passed through the vessel of the adsorber when the adsorber is in the on-stream state. For such embodiments, the inlet of the vessel during the on-stream state may function as an outlet for the regeneration gas and the outlet of the vessel during the on-stream state may function as an inlet for the regeneration gas.

Each adsorber 20 of the PPU 17 (e.g., first adsorber 17a, second adsorber 17b, etc.) can include a bed 20b of adsorbent material retained within a vessel that includes one or more layers of adsorbent material. A first adsorbent layer of a first bed 21 of adsorbent material can be configured via composition, layer thickness, particle size, pore volume, density, and/or chemical structure (e.g. how cations connect to the zeolite framework), etc. to selectively remove ambient moisture and can also remove $CO_2$ and/or other impurities and a second adsorbent layer of the first bed 20b can be configured via composition, layer thickness, particle size, pore volume, density, and/or chemical structure (e.g. how cations connect to the zeolite framework), etc. to selectively remove $CO_2$, $N_2O$, heavy hydrocarbons and/or other fluid constituents from the compressed air fed to the PPU 17 when the adsorber 20 is in the on-stream state.

The compressed fluid (e.g., compressed gas) passed through adsorbent bed 20b of an on-stream adsorber of the PPU 17, undesired components of the fluid stream such as ambient moisture, $CO_2$, $N_2O$, hydrogen, carbon monoxide, heavy hydrocarbon components etc. can be completely or partially removed. The purified fluid can be output from the PPU 17 to be fed to a cryogenic fluid processing system (e.g., an ASU system 1, etc.) or other plant processing system.

FIGS. 2 and 3 illustrate examples of how a fluid flow can be passed into the vessel of the adsorber 20 as an inlet feed 23 for being passed into contact with a first layer 21 of adsorbent material within the bed 20a of adsorbent material. The fluid can subsequently be passed through a second layer 22 of the adsorbent bed 20b. The adsorbent material of the second layer 22 can be different from the adsorbent material of the first layer 21. The purified fluid can then be output as a purified fluid flow 25 via an outlet of the adsorber 20.

The first layer 21 can be considered a water removal layer or moisture removal layer. The first layer 21 can also be considered a front-end layer because it can be positioned to first contact the fluid to be purified when the adsorber is in an on-stream state condition (which can also be referred to as an on-state status or an on-state position) for purification of a fluid. An example of adsorbent material that can be included in the first layer 21 includes alumina ($Al_2O_3$), activated alumina, or activated alumina impregnated with a potassium salt.

The second layer 22 can be considered a molecular sieve layer. The second layer 22 can also be considered a back-end layer because it can be positioned to contact the fluid to be purified after that fluid has already passed through the first layer 21 when the adsorber is in an on-state condition for purification of a fluid. An example of adsorbent material that can be included in the second layer 22 includes NaMSX, CaX, 13X, NaX, NaLSX, or other suitable molecular sieve layer adsorbent material that can facilitate adsorption of $CO_2$, $N_2O$, any moisture (e.g. water) that can be intentionally permitted to pass through the first layer 21 as discussed herein (e.g. core-shell adsorbent material or alumina/zeolite mixtures of adsorbent material, etc.). The adsorbent material of the second layer 22 can also be configured for removal of other impurities (e.g., hydrocarbons, etc.).

Conventionally, adsorbers 20 are designed and operated in a PPU to avoid permitting water to break through a moisture removal layer to a downstream layer (if present) or be output from the adsorber with water within the purified fluid. This demand to avoid water passing out of the PPU is often to avoid water freezing in downstream processing, which can cause serious, and expensive to fix problems (e.g., equipment malfunctioning, plugging, etc.). Conventional designs often configure a bed of adsorbent material 20b and set limits for nitrous oxide and/or carbon dioxide concentrations in the fluid output from a PPU to help ensure water is prevented from breaking through a water removal layer of the adsorber as well as preventing an undesired concentration of nitrous oxide and carbon dioxide from passing out of the adsorber for an on-state adsorber to avoid such impurities passing into downstream equipment, for example.

We have surprisingly found that this type of conventional approach has substantial draw backs and inefficiencies that have resulted in conventional adsorbers utilizing unnecessarily large beds of adsorbent material with sizing for a moisture removal layer that is overly sized due to the fear of water breaking through the adsorber and into downstream equipment. For example, it was surprisingly found that a water removal layer, or moisture removal layer in a first layer 21 of material can be between 10% and 20% of the overall volume or mass of a bed 20b of adsorbent material and provide sufficient water adsorption to provide a long lived bed 20b of adsorbent material capable of preventing water breaking through from the adsorber 20 while also removing a suitable level of nitrous oxide and carbon dioxide from the fluid to be treated. Moreover, it was surprisingly found that this condition exists for a large operational temperature range for the adsorber 20, which can range from 5° C. to 30° C. or 5° C. to 25° C., for example.

Figure 4:
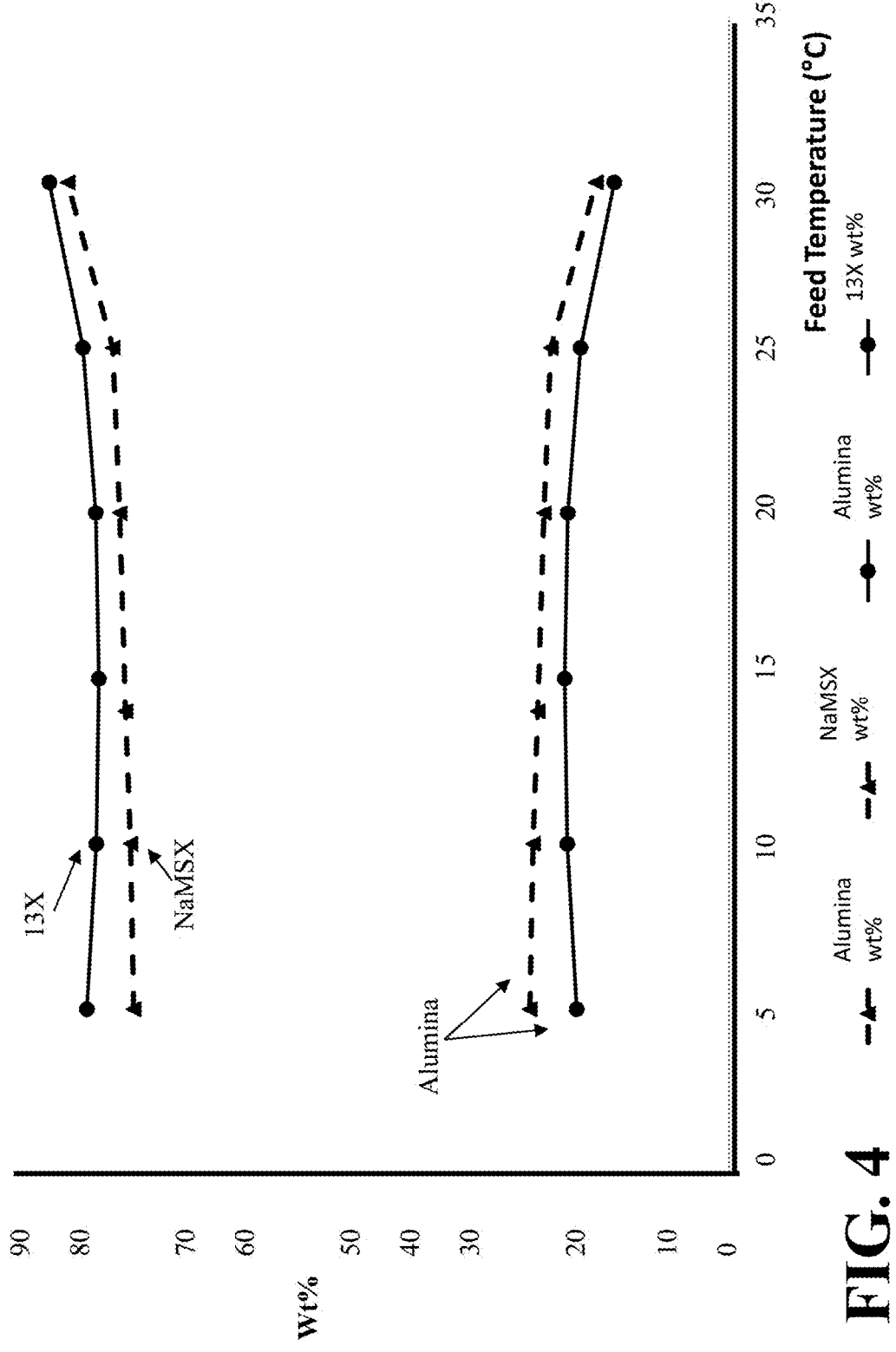
FIG. 4 is a graph illustrating results from evaluations of exemplary embodiments of our adsorber for use in pre-purification processing for cryogenic fluid applications.

FIG. 4 illustrates a graph that reflects evaluation work we performed on exemplary embodiments of our adsorber in which a nitrous oxide concentration of 105 parts per billion (ppb) in an adsorber outlet flow was the control setting for adsorber operation in the conducted evaluations. The graph of FIG. 4 shows exemplary adsorbent layer mass ratios for a temperature operational range of 5° C. to 30° C. (as well as a range of 5° C. to 25° C.) where the first layer 21 comprises alumina and the second layer 22 comprises NaMSX (has line with triangular data point markers) or 13X (solid line with circle data point markers). It was surprisingly found that as temperature increased over this range, the mass percentage of alumina was able to be maintained at about 20 weight percent (wt %) from 5° C. to 25° C. and that 13X could be maintained at 80 wt % of the overall mass of the adsorbent bed 20b. It was also surprisingly found that as temperature increased over the operational temperature range of 5° C. to 30° C. the mass percentage of alumina was able to be maintained at 25 wt % to 15 wt % while the mass of NaMSX could be maintained at 75 wt % to 85 wt % of the overall mass of the adsorbent bed 20b.

Figure 5:
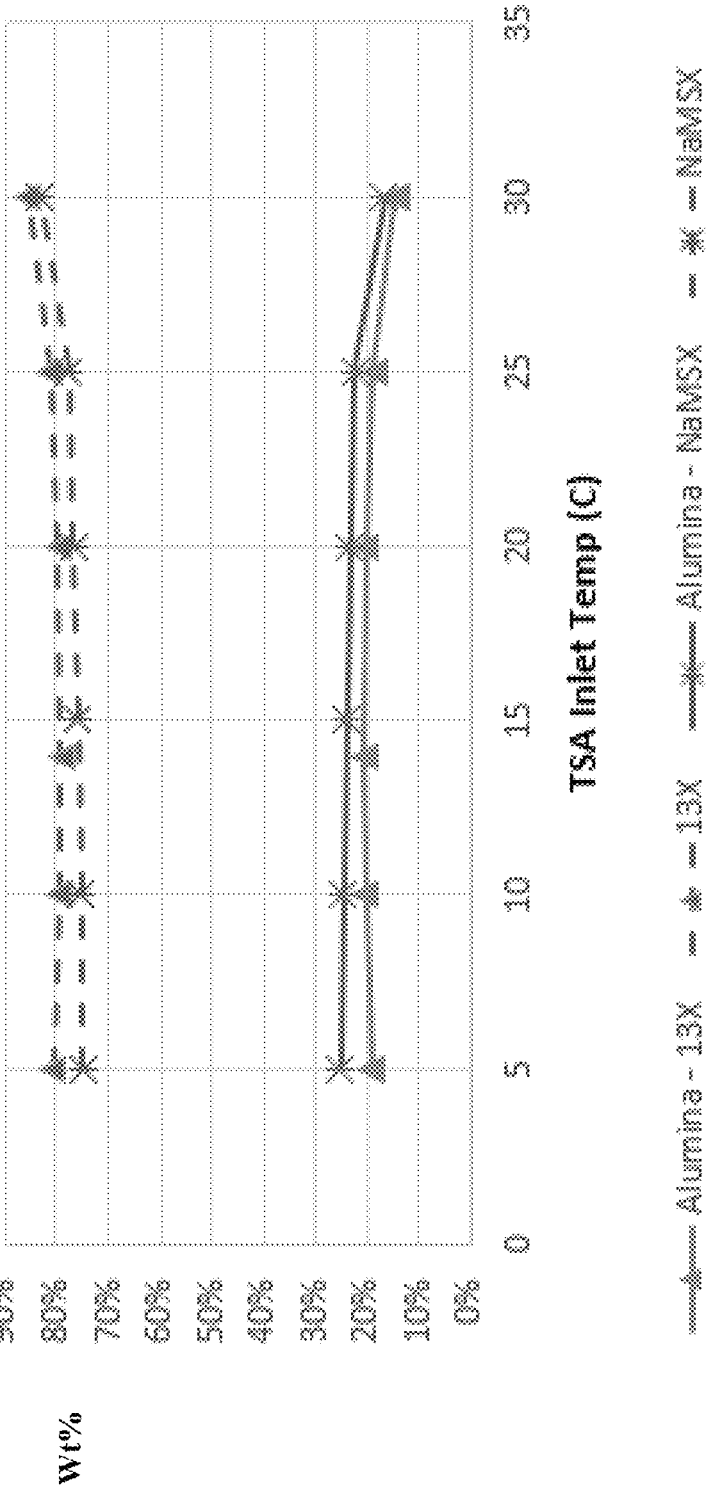
FIG. 5 is a graph illustrating results from evaluations of exemplary embodiments of our adsorber for use in pre-purification processing for cryogenic fluid applications.

FIG. 5 illustrates a graph that reflects other evaluation work we performed on exemplary embodiments of our adsorber that show exemplary adsorbent layer mass ratios for a temperature operational range of 5° C. to 30° C. (as well as a range of 5° C. to 25° C.) where the first layer 21 comprises alumina and the second layer 22 comprises NaMSX (lines with asterisk*data point markers) or 13X (lines with triangular data point markers). A nitrous oxide concentration of 105 ppb in an adsorber outlet flow was the control setting for adsorber operation in the conducted evaluations. It was surprisingly found that as temperature increased over this range, the mass percentage of alumina was able to be maintained at about 20 weight percent (wt %) from 5° C. to 25° C. and that 13X could be maintained at 80 wt % of the overall mass of the adsorbent bed 20b. It was also surprisingly found that as temperature increased over the operational temperature range of 5° C. to 30° C. the mass percentage of alumina was able to be maintained at 25 wt % to 15 wt % while the mass of NaMSX could be maintained at 75 wt % to 85 wt % of the overall mass of the adsorbent bed 20b. It was additionally surprisingly found that from 5° C. to 20° C., the NaMSX second layer 22 could be maintained at 75 wt % of the overall mass of the adsorbent bed 20b with the alumina first layer 21 being maintained at 25 wt %.

Figure 6:
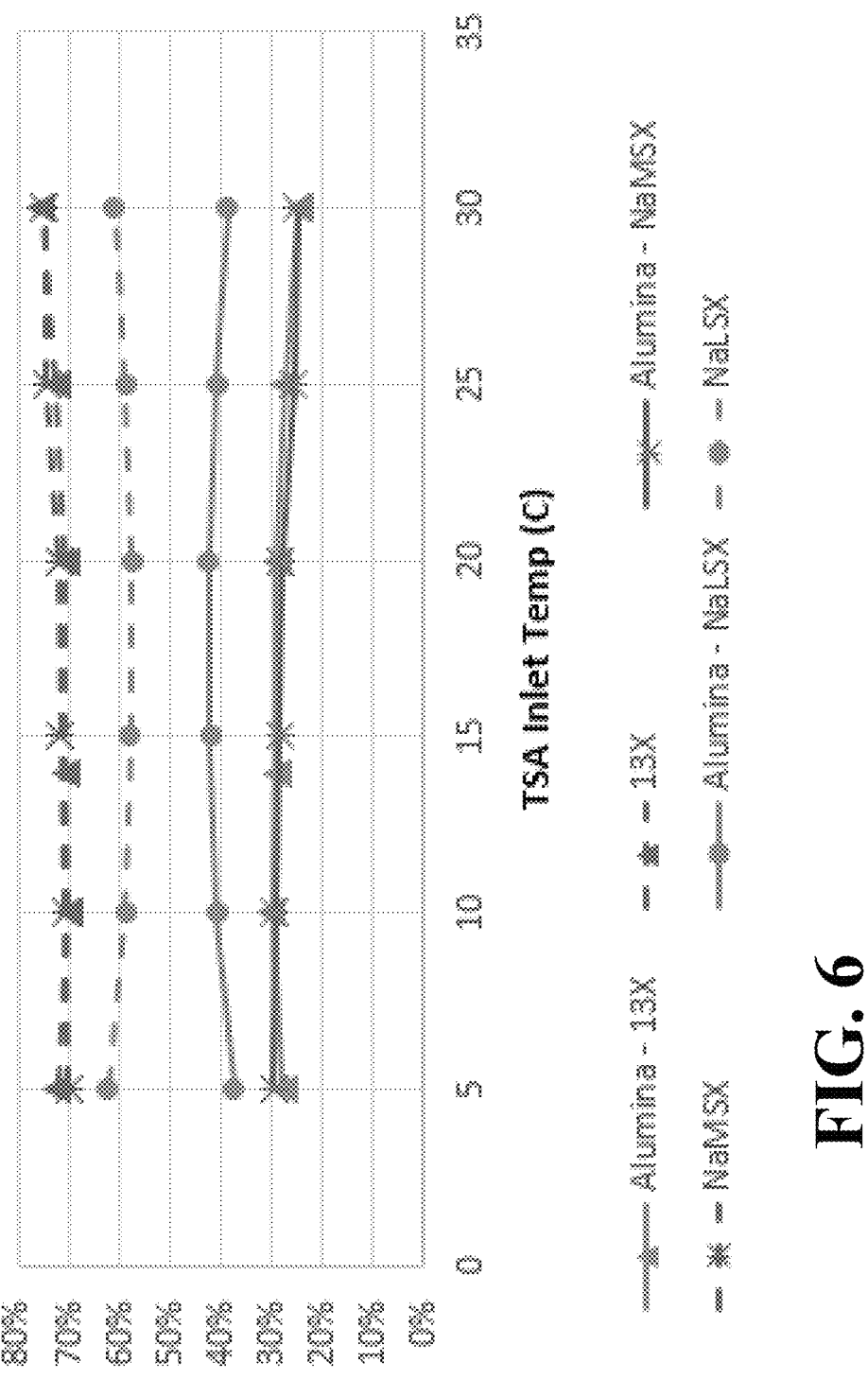
FIG. 6 is a graph illustrating results from evaluations of exemplary embodiments of our adsorber for use in pre-purification processing for cryogenic fluid applications.

FIG. 6 illustrates a graph that reflects additional evaluation work we performed on exemplary embodiments of our adsorber configured for temperature pressure swing adsorption (TPSA) that show exemplary adsorbent layer mass ratios for a temperature operational range of 5° C. to 30° C. (as well as a range of 5° C. to 25° C.) where the first layer 21 comprises alumina and the second layer 22 comprises NaMSX (lines with asterisk*data point markers), 13X (lines with triangular data point markers), or NaLSX (lines with circular data points). A nitrous oxide concentration of 105 ppb in an adsorber outlet flow was the control setting for adsorber operation in the conducted evaluations It was surprisingly found that as temperature increased over the operational temperature range of 5° C. to 30° C. the mass percentage of alumina was able to be maintained at 25 wt % to 30 wt % while the mass of NaMSX and 13X could each be maintained at 75 wt % to 70 wt % of the overall mass of the adsorbent bed 20b. It was also additionally surprisingly found that from 5° C. to 30° C., the NaLSX second layer 22 could be maintained at a weight percentage of between 65 wt % and 75 wt % of the overall mass of the adsorbent bed 20b with the alumina first layer 21 being maintained so it was between 25 wt % and 35 wt %.

Figure 7:
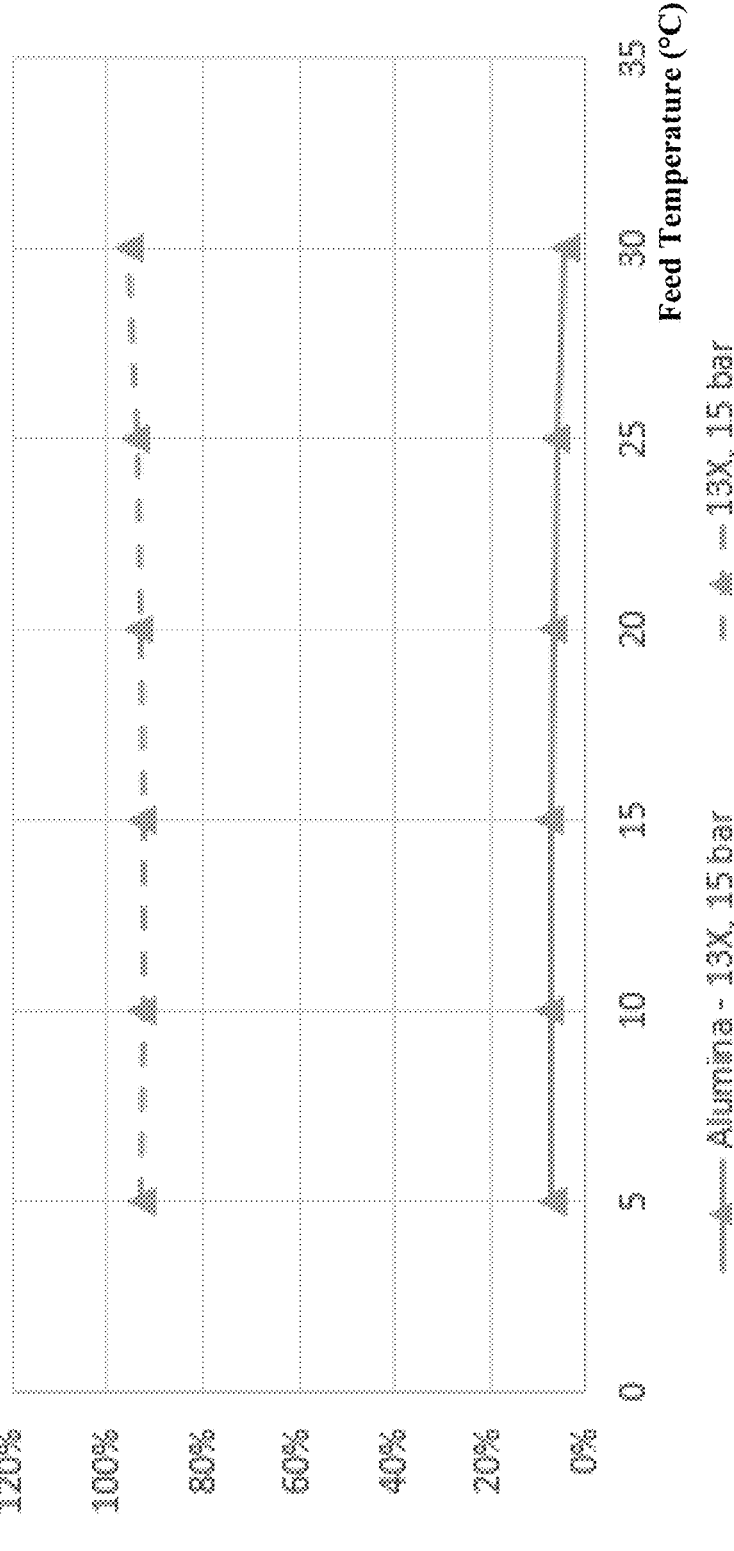
FIG. 7 a graph illustrating results from evaluations of exemplary embodiments of our adsorber for use in pre-purification processing for cryogenic fluid applications for an operational pressure of 15 bar.

FIG. 7 illustrates yet another graph that reflects additional evaluation work we performed on exemplary embodiments of our adsorber at an operational pressure of 15 bar that show exemplary adsorbent layer mass ratios for a temperature operational range of 5° C. to 30° C. (as well as a range of 5° C. to 25° C.) where the first layer 21 comprises alumina (solid line with triangular data point markers) and the second layer 22 comprises 13X (broken line with triangle data point markers) A nitrous oxide concentration of 105 ppb in an adsorber outlet flow was the control setting for adsorber operation in the conducted evaluations It was surprisingly found that as temperature increased over the operational temperature range of 5° C. to 30° C. the mass percentage of alumina was able to be maintained at 5 wt % to 10 wt % while the mass of 13X could be maintained at 95 wt % to 90 wt % of the overall mass of the adsorbent bed 20b.

Based on the conducted evaluations, it was surprisingly determined that a suitable adsorber could be provided for PPU operational purposes that had a surprisingly small proportion of a water adsorption layer as compared to a downstream molecular sieve layer. In some embodiments, the proportional range of mass of water adsorption (e.g., alumina) material to the mass of molecular sieve adsorption (e.g., 13X or NaMSX or NaLSX) can range of from 1:20 to 1:10 or 1:9 to 1:4 for operational temperature ranges of 5° C. to 30° C. In some configurations and implementations, this range can be 1:4 or can be in a ratio range of 1:1.4 to 1:5.7 for operational temperature operational ranges of 5° C. to 30° C. In other implementations, the proportional range of mass of water adsorption (e.g., alumina) material to the mass of molecular sieve adsorption (e.g., 13X or NaMSX or NaLSX) can be 1:20, between 1:20 and 1:10, can be 1:9 or can range from 1:9 to 1:5.7 for operational temperature ranges of 5° C. to 30° C.

Adsorbent material volume concentration ratios were found to have similar ranges for embodiments for the bed 20b of adsorbent material. For instance, in some embodiments, the proportional range of volume percent (vol %) of a water adsorption (e.g. alumina) material layer (e.g. first layer of material 21) to the vol % of the molecular sieve adsorption (e.g. 13X or NaLSX or NaMSX) layer (e.g. second layer of material 22) can range of from 1:1.4 to 1:4 for operational temperature ranges of 5° C. to 30° C. (e.g. this ratio can be 1:4, 1:3 or between 1:1.4 and 1:4, etc.) for the bed 20b of adsorbent material.

Some embodiments of the adsorber 20 can be provided so that there is no need for any type of third nitrous oxide removal layer downstream of the second layer 22. Such embodiments can be provided with only two layers of adsorbent material.

Embodiments of the adsorber 20 that can use alumina as the first layer of adsorbent material 21 and NaMSX as the second layer of adsorbent material 22 in which the first layer was about 20 vol % and about 20 wt % of the overall bed 20b and the NaMSX was about 80 vol % and about 80 wt % of the overall bed 20b (e.g. the NaMSX was between 75 wt % and 85 wt % and 75 vol % and 85 vol % of the bed 20b as a second layer 22 and alumina was the remaining portion of the bed as a first layer 21) was found to provide a significant reduction in overall adsorbent bed volume requirements as well as providing water removal, $CO_2$ removal, and $N_2O$ removal that avoided water breakthrough of the adsorber and only permitted $CO_2$ and $N_2O$ breakthrough at or below pre-selected thresholds for a pre-selected purification operational cycle time of at least 2 hours (and between 2 hours and 4 hours) based on conducted evaluations of embodiments of our adsorber for use in PPU 17 implementations. Some implementations having this configuration can be provided so that a volume reduction of between 14% and 40% can be provided for the sizing of an adsorber as compared to conventional designs.

In conducted evaluations of embodiments of our adsorber 20 having the first layer 21 of a relatively small overall size of the bed 20b (e.g. being no more than 30% of the size of the bed and being more than 5% or 10% of the size of the bend 20b) and a second layer 22 being a large overall size of the bed (e.g. at least 70% of the size of the bed 20b and being no greater than 90% or 95% of the overall size of the bed 20b), it was found that allowing water to break through the first layer 21 for adsorption within the second layer 22 provided unexpected benefits that resulted in a more efficient utilization of the adsorption capacity of the overall bed 20b while still preventing water from breaking through the adsorber without detracting from the ability of the second layer to remove sufficient levels of $N_2O$ and $CO_2$ from the fluid fed to the adsorber 20 for purification. This unexpected and surprising occurrence was found to occur due to a previously unanticipated impact the water passing into the second layer 22 can have on the adsorbent material.

For example, we believe that water breaking through the first layer 21 into the second layer 22 can cause the water to be preferentially adsorbed by the upstream portion of the second layer 22, which can cause $CO_2$ and $N_2O$ that was previously captured by that material to be released. The downstream portion of the second layer 22 can then adsorb that released $CO_2$ and $N_2O$ more efficiently because there is a higher concentration of $CO_2$ and $N_2O$ in the fluid to be adsorbed in the second layer due to the adsorption of water and release of other impurities that can occur. This permits the entirety of the second layer 22 to be more effectively used for adsorption of non-water impurities (e.g., $CO_2$ an $N_2O$) and permits a much larger portion of the material within the bed 20b to be fully utilized for adsorption.

For example, as it concerns the improvement in bed 20b utilization, the entirety of the first layer 21 can be more effectively utilized to full capacity because water is permitted to breakthrough that layer. This permits a downstream portion of the first layer 21 to be fully utilized or more fully utilized for adsorption as compared to conventional designs that prevent water from breaking through a first front-end layer. Also, the second layer 22 can be more fully utilized as noted above so that a larger extent of the second layer 22 is more fully utilized for adsorption of impurities (e.g. water, $CO_2$ an $N_2O$), which also permits a larger extent of the second layer 22 to be more fully utilized for adsorption as compared to conventional designs.

Figure 8:
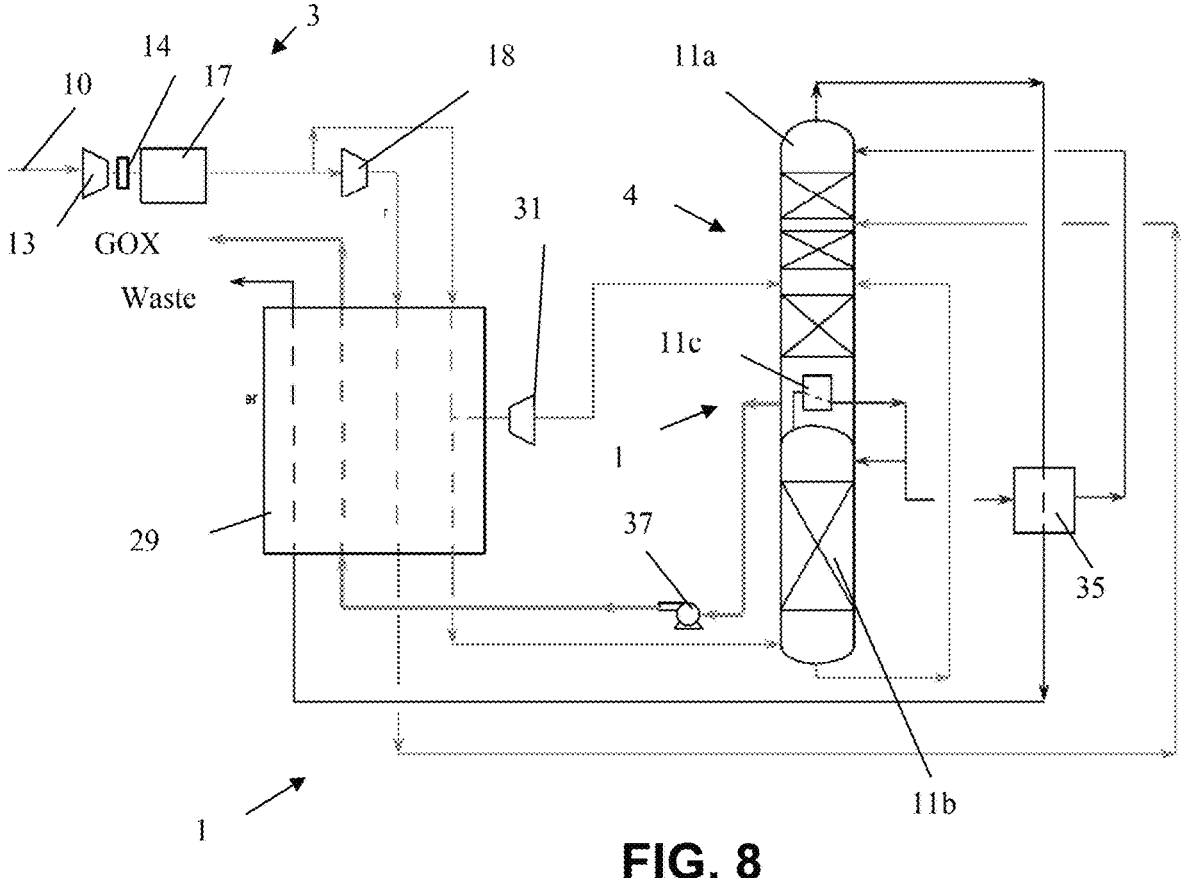
FIG. 8 is a schematic diagram of a first exemplary embodiment of a cryogenic fluid processing apparatus having an air separation unit (ASU) utilizing the first exemplary embodiment of the pre-purification system 3 that is positioned to purify an air flow for feeding to an air separation column assembly 4 for separation of the air into oxygen and/or nitrogen flows as well as other flows (e.g. at least one waste flow, and/or argon flow, etc.).

FIG. 8 illustrates an exemplary plant 1 that can be configured for an exemplary process of cryogenic fluid processing. Embodiments of the plant 1 can utilize an embodiment of the PPU 17 and/or one or more adsorbers 20 as discussed above. The embodiment of FIG. 8 can be configured as a plant that can include a cryogenic fluid processing system (e.g., air separation unit (ASU) system 1), for example. The ASU system 1 can be configured as a cryogenic air distillation system for generation of one or more output flows for providing one or more desired products (e.g. oxygen gas, and/or liquid oxygen, and/or nitrogen gas, and/or liquid nitrogen, and/or argon gas, and/or argon liquid, and/or other fluid flows, etc.). In some embodiments, the ASU system 1 can be a plant. In other embodiments, a plant can include the ASU system 1 as a component of a larger facility. For example, the plant that includes the ASU system 1 can be an industrial power plant, a large manufacturing facility, or other type of plant. Embodiments of the plant or ASU system 1 can utilize a controller to help monitor and/or control operations of the plant and/or ASU system 1.

The ASU system 1 can be configured to include a pre-purification system 3 configured to purify an intake flow of air to remove impurities from the air for feeding to an air separation column assembly 4 for separation of the air into one or more product flows of fluid and one or more waste flows of fluid. The one or more product flows can include at least one flow of nitrogen and/or at least one flow of oxygen and can also include one or more flows of argon, or other air component. The air separation column assembly 4 can also output one or more waste flows of fluid. The waste flows can be emitted to atmosphere and/or used in one or more other plant processes.

The air separation column assembly 4 can include a multiple column assembly 11 that includes a low pressure column 11a positioned above a high pressure column 11b. A reboiler-condenser 11c can be positioned between the high pressure column 11b and the low pressure column 11a in the multiple column tower arrangement. The high pressure column 11b can be considered a first column of the multiple column assembly that operates at a highest pressure of the columns of the multiple column tower assembly. For instance, the high pressure (HP) column 11b can operate at a pressure that is higher than the operational pressure of the low pressure (LP) column 11a, which can be considered a second column of the multiple column assembly.

In some embodiments, the LP column 11a can operate at a pressure of between 1.1 atm and 5 atm, between 1.1 atm and 3 atm or at a pressure that is greater than 1 bar and less than 5 bar, and the HP column 11b can operate at a pressure of between 4.5 atm and 15 atm, or at a pressure that is greater than 4 bar and less than 15 bar.

As may best be appreciated from FIGS. 1 and 8, an intake flow 10 of air or industrial gas can be passed through a compressor system 13 to compress the fluid to a higher pre-selected pressure. The pressurized fluid can be output from the compressor system 13 and fed to a pre-purification unit (PPU) 17 of a pre-purification system 3 via a compressed fluid feed conduit. The PPU 17 can be configured to purify the compressed flow of fluid output from the compressor system 13 to remove impurities from the fluid (e.g., remove water and the other impurities as noted above). The PPU 17 can be configured as an adsorption system that is designed to remove undesired impurities from the fluid such as, for example, carbon dioxide ($CO_2$), carbon monoxide (CO), water ($H_2O$), and nitrous oxide ($N_2O$), for example. The PPU 17 can be configured for pressure swing adsorption (PSA), temperature swing adsorption (TSA), or temperature pressure swing adsorption (TPSA).

An optional pre-PPU cooler 14 can be positioned between the compressor system 13 and the PPU 17 to cool the compressed fluid to a temperature within a pre-selected PPU temperature or PPU temperature range before the compressed fluid is fed to the PPU 17. The pre-PPU cooler 14 can be (or include) a chiller, a mechanical chiller, an absorption chiller or a heat exchanger that receives a cooling medium for cooling the fluid.

The purified compressed fluid can be output from the PPU 17 (e.g., as purified fluid flow 25 as discussed above) and fed to a main heat exchanger 29 via a heat exchanger feed conduit. Prior to being fed to the main heat exchanger 29, the purified fluid can be fed from the PPU 17 to a booster compressor 18 for further compressing at least a portion of the purified fluid output from the PPU 17 to a higher pressure. In such embodiments, the entirety of the compressed purified fluid output from the PPU 17 can undergo further compression or the flow can be split so that a first portion of the purified fluid output from the PPU 17 is fed directly to the main heat exchanger 29 while a second portion of the purified fluid output from the PPU 17 is fed to the booster compressor 18 to undergo further compression to a higher pressure before that second portion is fed to the main heat exchanger 29. A booster compressor feed conduit and booster compressor output conduit can be arranged to facilitate the feeding of fluid to the booster compressor 18 form the PPU 17 and the output of the further compressed fluid from the booster compressor 18 to the main heat exchanger 29.

In other embodiments, the booster compressor 18 may not be utilized and an entirety of the purified fluid output from the PPU 17 can be fed to the main heat exchanger 29 via a main heat exchanger feed conduit.

The main heat exchanger 29 can be configured to cool the compressed, purified fluid output from the PPU 17. The cooling can be provided via one or more flows of fluid output from the air separation column assembly 4. For instance, one or more flows of nitrogen fluid and/or oxygen fluid can be output from the air separation column assembly 4 so the one or more fluid flows are passed through the main heat exchanger 29 to function as a cooling medium for cooling the compressed, purified fluid output from the PPU. The flows of fluid from the air separation column assembly 4 can include at least one flow of nitrogen and at least one flow of oxygen (e.g., a flow of liquid oxygen, LOX). These flows of fluid output from the air separation column assembly 4 can be warmed by the compressed, purified fluid as they pass through the main heat exchanger 29. For example, in embodiments in which a LOX flow is fed to the main heat exchanger 29 as a cooling medium, this LOX flow may be heated so that it is output from the main heat exchanger 29 as a gaseous oxygen flow, GOX.

The cooled purified fluid can be output from the main heat exchanger 29 for being fed to the air separation column assembly 4 via at least one air separation column assembly feed conduit. The first portion of the compressed, purified air can be fed to the HP column 11b of the air separation column assembly 4. A portion of this first portion can be split therefrom to form a third portion of feed fluid. This third portion can be output from the main heat exchanger 29 and fed to an expander 31 to reduce the pressure of the third portion and also reduce the temperature of this portion of the fluid for feeding to the LP column 11a. The third portion of air can then be fed from the expander 31 to the low pressure (LP) column 11a of the air separation column assembly 4 via an expander LP feed conduit positioned between the expander 31 and LP column 11a.

The second portion of the compressed and purified fluid (the portion that may be further compressed via the booster compressor 18) can be output from the main heat exchanger 29 and fed to the LP column 11a as well. That being said, in embodiments that do not utilize the booster compressor 18, this second portion of fluid may not be present. In such embodiments, if the third portion of fluid that is fed to the expander 31 via splitting of the first portion of the compressed purified fluid fed to the main heat exchanger 29 is utilized, this third portion can be considered a second portion of the fluid instead of a third portion.

The HP column 11b can be positioned and configured to process the cooled first portion of the purified and pressurized fluid that is fed to the HP column 11b to form a first HP nitrogen-enriched vapor stream that is fed to the first reboiler-condenser 11c. In some embodiments, the HP nitrogen-enriched vapor stream can include 100-99 volume percent (vol. %) nitrogen or at least 95 vol. % nitrogen.

The HP column 11b can also form a first HP oxygen-enriched stream. The HP oxygen-enriched stream can be a fluid that is liquid, vapor, or a combination of liquid and vapor. In some embodiments, the HP oxygen-enriched stream can include 30-40 vol. % oxygen, and 1-3 vol. % argon, and the balance nitrogen (e.g., 69-57 vol. % nitrogen).

The first HP nitrogen-enriched vapor stream can be fed to the reboiler-condenser 11c to from an HP condensate flow that can be split into multiple portions via a conduit arrangement that includes at least one valve or other flow splitting mechanism. For instance, a first portion of the HP condensate flow can be output from the first reboiler-condenser 11c and subsequently recycled back to the HP column 11b as an HP reflux stream via a HP reflux stream conduit.

A second portion of the HP condensate flow can be output from the reboiler-condenser 11c and then fed to a subcooler 35 via a subcooler feed conduit. The subcooler 35 can be a heat exchanger that can cool the second portion of the HP condensate flow so that this second portion is at a lower temperature that is suitable for feeding to the LP column 11a as a nitrogen-enriched LP feed that is fed to the LP column 11a via a nitrogen-enriched LP feed conduit extending from the subcooler 35 to the LP column 11a. The second portion of the HP condensate flow can be reduced in pressure for feeding to the LP column (e.g., via a valve of the nitrogen-enriched LP feed conduit extending from the subcooler 35 and/or via another type of pressure reduction mechanism included in this conduit). The nitrogen-enriched LP feed can be a substantially nitrogen-enriched liquid feed (e.g., be entirely liquid, be at least 90% by volume liquid, be at least 80% by volume liquid, etc.).

The first HP oxygen-enriched stream can be fed to the subcooler 35 (not shown) to undergo cooling. Alternatively, the first HP oxygen-enriched stream can forego such cooling via the subcooler 35. In some embodiments, the first HP oxygen-enriched stream can be passed through an HP oxygen-enriched stream conduit extending from the HP column 11b that is configured so that the HP oxygen-enriched stream output from the HP column 11b can be reduced in pressure via a pressure reduction mechanism (e.g. an expander, a valve, etc.) and subsequently fed to the LP column 11a as a substantially liquid oxygen-enriched feed to the LP column 11a.

Reflux for the LP column 11a can be provided via the nitrogen-enriched LP feed that is fed to the LP column 11a via a nitrogen-enriched LP feed conduit extending from the subcooler 35 to the LP column 11a. As discussed above, this nitrogen-enriched LP feed can be formed via the second portion of the HP condensate flow output from the reboiler-condenser 11c. There may be additional liquid provided via one or more of the oxygen-enriched feeds fed to the LP column 11a.

Rising vapor, or column boil-up for the LP column 11a can also be formed via the reboiler-condenser 11c and can be fed to the LP column 11a such that the vapor (or gas) within the LP column 11a flows in counter-current flow to the liquid fed to the LP column 11a (e.g. the nitrogen-enriched LP feed flows downwardly as the rising vapor flows upwardly in the LP column 11a, etc.).

The LP column 11a can operate to output multiple separated flows of fluid. Some of these flows of fluid can be considered nitrogen waste streams of fluid that may be predominantly comprised of nitrogen gas and/or nitrogen liquid (e.g., be at least one nitrogen-enriched waste stream). For example, the LP column 11a can operate to output an upper vapor waste stream and a first LP oxygen-rich liquid stream. In at least some embodiments, the LP column 11a can also output a top nitrogen-rich vapor output stream (not shown), a first argon-enriched vapor stream (not shown), as well as one or more other output flows.

The upper vapor waste stream can be output from the LP column 11a and fed to the subcooler 35 to function as a cooling medium for cooling the second portion of the HP condensate flow output from the reboiler-condenser 11c and fed to a subcooler 35 via the subcooler feed conduit. This waste vapor stream can then be output from the subcooler 35 and fed to the main heat exchanger 29 to function as a cooling medium therein as well before being output from the main heat exchanger 29 as a waste stream that may be emitted to the atmosphere or otherwise used in the plant to which the ASU system 1 may be connected (e.g. for mixing with a flue gas or to pass through another heat exchanger for subsequent use in the plant etc.).

The first LP oxygen-rich liquid stream output from the LP column 11a can be fed to a pump 37 to increase the pressure of this flow before it is fed to the main heat exchanger 29 to function as a cooling medium. The warmed oxygen-rich stream can be output from the main heat exchanger as a GOX stream in some embodiments as noted above.

As discussed above, embodiments of the PPU 17 that utilize embodiments of our adsorber 20 can permit the ASU system 1 to operate more efficiently while also avoiding undesired levels of impurities passing into equipment downstream of the PPU. For example, embodiments of the PPU 17 can be operated so that the on-state adsorber 20 of the PPU 17 is able to remove all water from the compressed fluid fed to the PPU to undergo purification and can remove sufficient $N_2O$ and $CO_2$ so that the $CO_2$ is at or below 1 part per million (ppm) $CO_2$ or other pre-selected $CO_2$ content threshold within the output purified fluid and the $N_2O$ is at or below 350 parts per billion (ppb) or other pre-selected $N_2O$ content threshold within the output purified fluid (e.g. 150 ppb, 105 ppb, etc.). The PPU 17 can be controlled and operated such that when a $CO_2$ and/or $N_2O$ content within the output fluid is detected as being at or sufficiently near a pre-selected impurity threshold content level, the on-state adsorber is switched to an off-state status (which can also be called an off-stream state or off-stream status) for undergoing regeneration via a regeneration flow while the off-state adsorber is switched to an on-state to receive the compressed fluid for purifying that fluid. The cycling of on-state and off-state adsorbers can occur repeatedly as discussed above. In some embodiments, the cycle time for on-state and off-state cycling can be between 2 hours and 8 hours, greater than 1 hour and less than 8 hours, between 1 hour and 6 hours, between 4 hours and 6 hours, or other time period.

FIG. 9 illustrates an exemplary process for purification of a fluid flow for cryogenic fluid processing. Embodiments of the PPU 17 and cryogenic fluid processing apparatus discussed above can be configured to utilize this exemplary embodiment of the process.

As shown in FIG. 9, a first step S1 of the process can include filling a vessel of an adsorber 20 to have a bed 20b of adsorbent material that includes a first layer 21 and a second layer 22. The first layer can include alumina and the second layer can include a suitable molecular sieve adsorbent material (e.g., 13X, NaMSX, NaLSX).

In a second step S2, the adsorber 20 having the formed bed 20b can be positioned for receiving fluid for purification of the fluid for subsequent cryogenic processing. For example, the adsorber can be included within a PPU 17 of a pre-purification system 3.

In a third step S3, the adsorber 20 can be operated so that it receives fluid for purification. The adsorber 20 can be operated so that water within the received fluid passes through, or breaks through, the first layer 21 that is upstream of the second layer 22 so that some water within the fluid passes into the second layer 22 for adsorption by the second layer 22 without water passing out of the adsorber 20. Other impurities within the fluid to be purified can be removed via adsorption with the second layer 22 of adsorbent material as the fluid passes through the second layer 22. These other impurities that are adsorbed by the second layer 22 can include $CO_2$ and $N_2O$ as discussed above, for example.

In a fourth step S4, the adsorption capacity of the bed 20b can be detected as being met or at a pre-selected level for switching the adsorber 20 to an off-state status for undergoing regeneration of the bed 20b of adsorbent material as discussed above. This detection may occur after 1 or more hours of operation (e.g., between 2 and 8 hours of operation, between 2 hours and 6 hours of operation, between 4 hours and 6 hours of operation, at least 3 hours of operation and less than or equal to 8 hours of operation, every 8 hours of operation, every 6 hours of operation, every 2 hours of operation, etc.). The detection can be provided via at least one concentration sensor or other sensor that monitors a concentration of one or more impurities within the flow output from the adsorber (e.g., a concentration of $N_2O$ and/or $CO_2$, etc.). The adsorber 20 can then be switched to the off-state status while an off-state adsorber is switched into an on-state status. A controller can receive data from one or more sensors to automatically control valves or other elements to facilitate the switching of adsorbers 20 of the PPU 17 between their on-state and off-state statuses.

In a fifth step S5, a regeneration gas flow RGF can be passed into the off-state adsorber 20 to heat the adsorbent material for the adsorbed impurities to be released from the material so that the adsorbent material can be regenerated for subsequent purification use and the adsorber 20 can be returned to the on-state status. The adsorber 20 can then be switched to an on-state status after the adsorber that is currently in an on-state status reaches its adsorbent capacity limit as pre-defined or pre-selected by an operator.

It should be appreciated that embodiments of the process can permit substantial benefits as noted above. For instance, embodiments can permit improved and greater utilization of the material of the bed 20b while also permitting smaller sized adsorbers to be utilized for purification processing as discussed above. Also, improved efficiency in regeneration of the bed 20b and in filling the vessel of the adsorber 20 to form the bed can be provided as discussed above.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. As another example, the flow rate, pressure, and temperature of the fluid passed through the adsorber as well as passed through other plant elements can vary to account for different plant design configurations and other design criteria. As yet another example, the material composition for the different structural components of the adsorbers 20, PPU 17, and ASU system 1 can be any type of suitable materials as may be needed to meet a particular set of design criteria. For example, some embodiments can utilize at least one third layer and/or one or more other additional layers of adsorbent material in some contemplated embodiments. Also, embodiments can be utilized in conjunction with any type of adsorber vessel—radial, vertical, horizontal, vertical cross flow, etc. for a PPU 17.

It should be appreciated that embodiments of the ASU system 1 can be configured as an air separation plant or be incorporated into another type of plant in which at least one adsorber 20 can be utilized. The plant. adsorption system, PPU 17, and the adsorber 20 can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the adsorber, adsorption system, PPU, plants having an adsorption system utilizing one or more of the adsorbers, ASU systems, cryogenic fluid processing system, and methods of making and using the same have been shown and described above, it is to be distinctly understood that the invention is not limited thereto but may be otherwise variously embodied and practiced within the scope of the following claims.

What is claimed is:

1. An adsorber for a pre-purification unit (PPU) of a cryogenic fluid processing system, comprising:
  a vessel connectable between a compressor system and a heat exchanger;
  a bed of adsorbent material being positioned in the vessel, the bed comprising a first layer of adsorbent material for removal of water and a second layer of adsorbent material for removal of water as well as other impurities that include carbon dioxide ($CO_2$) and nitrous oxide ($N_2O$), wherein the first layer comprises alumina, activated alumina, or alumina impregnated with a potassium salt, and the second layer comprises NaMSX, NaLSX, or 13X and wherein a ratio of a mass of adsorbent material of the first layer to a mass of adsorbent material of the second layer within the bed is between 1:20 and 1:4;
  the bed of adsorbent material positioned and configured such that the first layer is positioned adjacent the second layer so that water breaks through the first layer to the second layer during purification of a fluid passed through the bed so that the second layer removes water as well as the other impurities from the fluid to output a purified fluid that has no water and the other impurities are at or below at least one pre-selected threshold.

2. The adsorber of claim 1, wherein the fluid is air or other gas.

3. The adsorber of claim 1, wherein the fluid is air or an industrial gas flow and the bed is configured for operation at a temperature range of between 5° C. and 30° C.

4. The adsorber of claim 1, wherein a ratio of a mass of adsorbent material of the first layer to a mass of adsorbent material of the second layer within the bed is between 1:9 to 1:5.7.

5. A pre-purification system comprising:
  an adsorber, the adsorber having a vessel, the vessel having a bed of adsorbent material comprising a first layer of adsorbent material for removal of water and a second layer of adsorbent material for removal of water as well as carbon dioxide ($CO_2$) and nitrous oxide ($N_2O$), wherein the first layer comprises alumina, activated alumina, or alumina impregnated with a potassium salt, and the second layer comprises NaMSX, NaLSX, or 13X and wherein a ratio of a mass of adsorbent material of the first layer to a mass of adsorbent material of the second layer within the bed is between 1:20 and 1:4;
  the bed of adsorbent material positioned and configured such that the first layer is positioned adjacent to the second layer and sized such that water breaks through the first layer to the second layer during purification of a fluid passed through the bed so that the second layer removes water as well as $CO_2$ and $N_2O$ from the fluid to output a purified fluid that has no water therein.

6. The pre-purification system of claim 5, wherein the fluid is air or an industrial gas flow and the purified fluid has a content of $CO_2$ that is at or below a pre-selected $CO_2$ content threshold and/or the purified fluid has a content of $N_2O$ that is at or below a pre-selected $N_2O$ content threshold.

7. The pre-purification system of claim 5, wherein the bed is configured for operation at a temperature range of between 5° C. and 30° C.

8. The pre-purification system of claim 5, wherein the bed is configured so that a third layer is not utilized.

9. The pre-purification system of claim 5, wherein a ratio of a mass of adsorbent material of the first layer to a mass of adsorbent material of the second layer within the bed is between 1:9 to 1:5.7.

10. A process for purifying a fluid for cryogenic processing comprising:

operating an adsorber to receive fluid for purification, the adsorber having a bed of adsorbent material comprising a first layer and a second layer that is downstream of the first layer, wherein the first layer comprises alumina, activated alumina, or alumina impregnated with a potassium salt, and the second layer comprises NaMSX, NaLSX, or 13X and wherein a ratio of a mass of adsorbent material of the first layer to a mass of adsorbent material of the second layer within the bed is between 1:20 and 1:4; and passing the fluid through the bed so that water within the fluid breaks through the first layer to the second layer for adsorption in the second layer to remove water from the fluid via the second layer, the second layer also removing carbon dioxide ($CO_2$) and nitrous oxide ($N_2O$) from the fluid while water is being removed from the fluid via the second layer.

11. The process of claim 10, comprising outputting the purified fluid for cryogenic processing such that the purified fluid has no water therein and has a content of $CO_2$ that is at or below a pre-selected $CO_2$ content threshold and/or the purified fluid has a content of $N_2O$ that is at or below a pre-selected $N_2O$ content threshold.

* * * * *